United States Patent Office 3,463,980
Patented Aug. 26, 1969

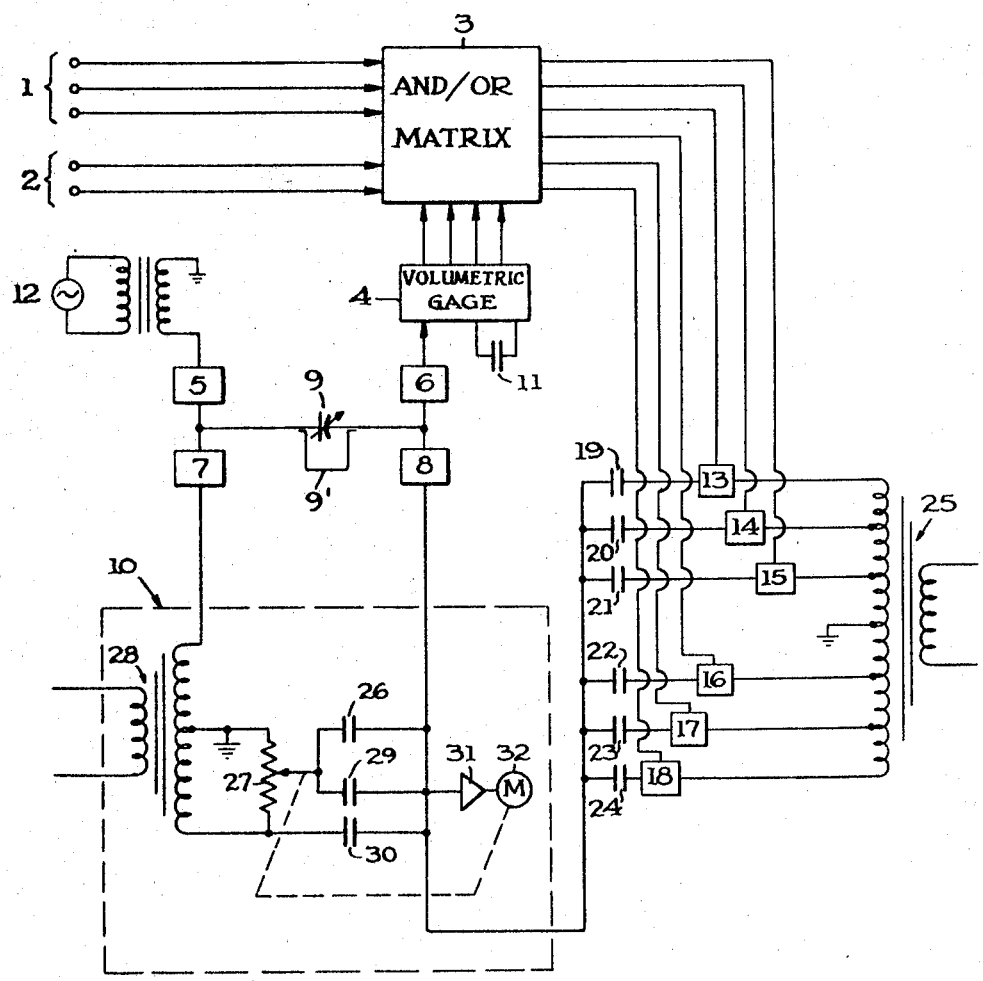

3,463,980
SERVO-CONTROLLED ATTITUDE ERROR CORRECTION FLUID GAGING SYSTEM
Irving H. Cohn, New York, and Frank De Nardo, Huntington, N.Y., assignors to Simmonds Precision Products, Inc., Tarrytown, N.Y., a corporation of New York
Filed Oct. 26, 1966, Ser. No. 589,631
Int. Cl. H02p 1/54, 5/46, 7/68
U.S. Cl. 318—18          4 Claims

ABSTRACT OF THE DISCLOSURE

A servo-controlled attitude error correction system for airborne fuel gages wherein a computer system is provided for listing a series of calculated errors, and attitude sensor inputs are compared with the input indicating fule level uncorrected for attitude. An AND-OR matrix in the computer system actuates a switching matrix for controlling the current input to the fuel gage in accordance with the attitude sensor inputs to the computer system.

---

This invention relates to an attitude error correction system for fluid gauging in which a unique computer program servo system cancels errors caused by attitude variations of the fluid with respect to its container and thereby provides a corrected indication of the quantity of fluid in the container.

In fluid gauging systems, particularly those systems for the measurement of aircraft fuel volume or weight, the sensing system is designed to minimize errors due to the aircraft's attitude, that is, its pitch and roll. Normally, sensing systems currently used consist of an appreciable number of capacitance sensing elements distributed in the fluid container, or tank, which is usually of an irregular shape. These sensing elements, then, are profiled, that is, their respective capcitances are varied with the height of the container in order to provide a current for a servo-bridge indicator circuit which is linear with either volume or mass as desired. Further, in addition to profiling the sensors they also are selectively placed within the tank in order to minimize as much as possible the variations caused by attitude changes of the aircraft.

Profiling of the capacitance sensor is normally determined by means of computer studies which optimize the capacitance probe sensors at the required attitudes of the aircraft, and one of the results of such computer studies is a series of listings of the calculated error at each fluid height and each required aircraft attitude. Experience has shown that the actual error in measurement obtained during testing with aircraft closely follows that predicted by the computerized results. It is, therefore, the purpose of this invention to utilize these error tabulations in order to further correct the indicated readings derived from capacitance sensors of the fuel gauging system and hence provide a system in which all errors caused by attitude variations of the aircraft are reduced to substantially zero. With the advantage of attitude correction, a much smaller number of capacitance sensing probes may be employed than that number ordinarily used with a standard fuel gauging system in a given container, and, further, it is possible that the probe employed with this invention need not be profiled in the manner previously described.

Accordingly, it is an object of this invention to provide a high speed computerized error correction system for use with fluid gauging systems.

It is another object of this invention to provide an error correction system which complements a conventional fluid gauging system without affecting the independent operation thereof.

It is yet another object of this invention to provide an error correction system for the attitude of aircraft to be used with a fuel gauging system in order to provide an accurate indication of the quantity of fuel regardless of the attitude of the aircraft.

It is still another object of the invetnion to provide an attitude correction system for use with standard fuel gauging systems which allow the employment of a relatively small number of sensing probes and wherein these probes need not be profiled to the container in which they are housed.

In carrying out the objectives of this invention it is necessary to have available on a real time basis an indication of the actual aircraft pitch and roll. These indications may be obtained from either the aircraft attitude sensors or from suitable stable sensing devices employed for this particular purpose. A computer system is provided for listing a series of calculated errors at each fluid height (or volume) and each required aircraft attitude. The terms "volume" and "height" are used interchangeably since one output from the computer studies is a tabulation of height vs. volume for all attitudes required. The attitude sensor inputs to the computer are compared with the inputs indicating the fuel level uncorrected for attitude, and with the previous knowledge of actual errors óbtained from the computer studies, corrections will be made by way of a variable input current to the servo mechanism of a standard mass gauge.

Other objects and advantages of this invention will become apparent upon a further study of the specification and drawing in which there is shown:

A schematic diagram illustrating a preferred embodiment employing the concept of this invention.

Referring now to the drawing, there is shown at 1 and 2 the input terminals which manifest, respectively, the signals of pitch and roll angles of the aircraft. Pitch and roll attitudes are understood to be the attitude of the fuel surface with respect to a plane through the aircraft which is parallel to the ground when the aircraft is at ground attitude. The aircraft pitch sensors will provide readings under all conditions of pitch attitude except during pitch changes. The required roll attitudes may be obtained from a suitable pendulum-type or spirit-level-type sensor. As an example, the aircraft may be rolled to +20°, but if it is in a controlled turn, the fuel surface attitude may be zero. Utilizing digital techniques as one preferred embodiment, these attitude signals are fed along digital lines into the AND-OR matrix 3. Simultaneously, the fuel volume input signals are introduced into 3 from the volumetric gauge 4 which shares the capacitance tank sensor 9 in the tank 9′ with the standard mass fuel gauge 10. Since the mass gauge 10, per se, does not form the invention, it will suffice to only summarily describe its operation. A detailed description, however, can be had from reference to U.S. Patent No. 2,981,105, issued to F. L. Ryder on Apr. 25, 1961, and U.S. Patent No. 3,050,999, issued to H. F. Edwards on Aug. 28, 1962.

The mass gauge 10 comprises the capacitance sensor or measuring condenser 9 immersed in the fuel tank 9'. One electrode of the condenser 9 is connected to the end terminal of the secondary winding of transformer 28. The secondary winding is provided with a center tap which is shown connected to ground. A fixed capacitor 30 is connected between the free end terminal of the secondary winding and the input to amplifier 31. A rebalancing potentiometer 27 is connected across the lower half of the secondary winding between the center tap and the last-mentioned terminal. The slider of the potentiometer is connected to a fixed capacitor 29 and to the input of the amplifier 31. Capacitor 26 is a mass compensator connected in parallel with capacitor 29. The other electrode of the measuring condenser 9 is also connected to the input of amplifier 31. The transformer 28 is provided with a primary winding which may be connected to a source of alternating current operating at 400 cycles. An amplifier 31 has its input connected to the output of the bridge circuit between ground and its input. The output of the amplifier 31 is coupled to a conventional phase rebalancing motor 32 and to the slider of the potentiometer 27. Thus, in the circuit just described if there is any change in the capacity of measuring condenser 9, a signal will be supplied to the motor 31 causing it to reposition the slider of the potentiometer 27 in a direction tending to reduce the signal to zero and rebalance the bridge. It will be seen that the position of a suitable servo-indicating pointer, not shown but normally connected to the rebalancing potentiometer 27, will continuously change as the tank capacitor unit senses the fuel depletion thereby indicating the mass of fluid in the tank 9'.

As previously mentioned, the measuring condenser 9 in the tank 9' is shared with the mass gauge 10 as well as the volumetric gage 4. The volumetric gage 4 is a bridge circuit similar to the mass gauge 10 but employing a volumetric compensator capacitor 11. The volumetric bridge 4, however, may be a completely digital device. A transformer 12 operating at 200 cycles supplies the voltage for the volumetric gage 4. High pass filters 5 and 6 prevent the 400 cycles from transformer 28 entering the volumetric gage 4, while low pass filters 7 and 8 prevent the 2000 cycle signal from transformer 12 from entering the mass gage 10. This system, therefore, is a frequency multiplexing one utilizing a single set of tank sensors 9.

It will be seen that the input signals to the matrix 3 combine pitch, roll and volume, all of which occur simultaneously, and which can be shown from a preselected set of computed error curves to have associated therewith a particular known error. When any one of a given number of combinations of signals occur, one or more AND gates are fired which, in turn, activate one or more solid state switches 13, 14, 15, 16, 17, or 18. These switches connect capacitors 19, 20, 21, 22, 23 and 24 to a given portion of the secondary of transformer 25 such that a correcting current of the proper magnitude is fed to the input of amplifier 31 of the mass gage 10. This corrective current causes the motor 32 to turn and hence moves the pointer of the rebalancing potentiometer 27 to the corrected position thereby removing the previous error. Although the above steps have been described sequentially, the action will be so fast as to appear simultaneous with any change of roll, pitch and volume.

It should be understood that the error correcting system, that is, the components making up this system, is "added" onto the standard mass gage 10. Thus, removal of, or failure of, any or all the components except the standard mass gage will not affect the proper operation of the latter. For this reason, the error correcting system constructed in accordance with the principles of this invention may be added to present existing fuel gage systems in order to reduce previously tolerated errors.

Although only one embodiment of the invention has been depicted and described, it will be apparent that this embodiment is illustrative in nature, and that a number of modifications in the apparatus, including analog techniques, and variations in its end use may be effected without departing from the spirit or scope of the invention as defined in the appended claims.

That which is claimed is:

1. In an error correction system for use with a fluid gage employing a bridge circuit having a rebalancing servo means and indicator for comparing a first signal responsive to the height of fluid in a container, and a second predetermined fixed signal, the combination comprising: a first source of voltage for supplying said first signal to an AND-OR matrix means, means supplying a third set of signals to said matrix means, error storage means in said matrix responsive to said third set of signals, switching means responsive to said matrix means, said switching means opening and closing according to selected voltages corresponding to respective combinations of said signals supplied to said matrix means, and a second source of voltage connected to said switching means for supplying a current to said rebalancing servo means, said current having a magnitude determined by the operating condition of said switching means, whereby said servo means is rebalanced with the addition of said current to said bridge circuit.

2. In an error correction system for use with a fluid gage employing a bridge circuit having a rebalancing servo means and indicator for comparing a first signal responsive to the height of fluid in a container, and a second predetermined fixed signal, the combination comprising: a source of alternating voltage for supplying said first signal to an AND-OR matrix, an error sensing means for supplying a set of representing an error associated with said first signal to said matrix, plurality switching means responsive to said matrix, said switching means opening and closing according to selected voltages in said matrix corresponding to respective combinations of said signals supplied to said matrix, and a second source of alternating voltage connected to said switching means for supplying a current to said rebalancing servo means, said current having a magnitude determined by the operating condition of said switching means, whereby the error inherent in said first signal is corrected in said bridge circuit and indicator by the addition of said current to said servo means.

3. In an error correcton system for use with a fluid gage employing a bridge circuit having a rebalancing servo means and indicator connected to an amplifier for comparing a first equal responsive to the height of fluid in a container, and a second predetermined fixed signal, the combination comprising: a source of alternating voltage for supplying said first signal to an AND-OR matrix means, means supplying a set of signals representing an error associated with said first signal, switching means responsive to said matrix means, said switching means opening and closing according to selected voltages in said matrix means corresponding to respective combinations of said signals supplied to said matrix means, a second source of alternating voltage connected to said switching means for supplying a current to said amplifier, said current having a magnitude determined by the operating condition of said switching means, whereby the error inherent in said first signal is corrected by the addition of said current to said servo means.

4. In an error correction system for use with a fluid gage employing a bridge circuit having a rebalancing servo means and indicator for comparing a first signal responsive to the height of fluid in a container, and a second predetermined fixed signal, the combination comprising: a source of alternating voltage for supplying said first signal to an AND-OR matrix means, means supplying a set of signals representing the attitude of said container with respect to a horizontal plane to said matrix means, error storage means in said matrix responsive to said set of attitude signals, plural switching means responsive to said matrix means, said switching means opening and closing according to selected voltages in said matrix means corresponding to respective combinations of said signals supplied to said matrix means, and a second source of voltage connected to said switching means for supplying a current to said rebalancing servo means, said current having a magnitude determined by the operating condition of said switching means, whereby the addition of said current to said bridge circuit corrects the error contributed to said first signal resulting from the attitude of said container.

References Cited

UNITED STATES PATENTS 1,318,196   10/1919   Case.
3,010,319   11/1961   Sontheimer.

ORIS L. RADER, Primary Examiner

THOMAS E. LYNCH, Assistant Examiner

U.S. Cl. X.R.

73—304; 318—28

UNITED STATES PATENT OFFICE
CERTIFICATE OF CORRECTION

Patent No. 3,463,980      Dated Aug. 26, 1969

Inventor(s) Irving H. Cohn and Frank De Nardo

It is certified that error appears in the above-identified patent and that said Letters Patent are hereby corrected as shown below:

In Col. 3, line 43, "200 cycles" should read --2,000 cycles--; in Col. 4, line 37, the word "signals" should be inserted between "of" and "representing"; in Col. 4, line 38, "plurality" should read --plural--

SIGNED AND
SEALED

DEC 2 - 1969

(SEAL)
Attest:

Edward M. Fletcher, Jr.
Attesting Officer

WILLIAM E. SCHUYLER, JR.
Commissioner of Patents